United States Patent
Van Haveren et al.

(10) Patent No.: US 10,125,216 B2
(45) Date of Patent: Nov. 13, 2018

(54) POLYISOIDIDE FURANOATE THERMOPLASTIC POLYESTERS AND COPOLYESTERS AND A USE THEREOF IN HOT FILL PACKAGING

(71) Applicant: Stichting Wageningen Research, Wageningen (NL)

(72) Inventors: Jacobus Van Haveren, Wageningen (NL); Johannes Rutger Idsard Knoop, Wageningen (NL); Daniel S. Van Es, Wageningen (NL); Willem Vogelzang, Wageningen (NL)

(73) Assignee: Stichting Wageningen Research, Wageningen (NL)

( * ) Notice: Subject to any disclaimer, the term of this patent is extended or adjusted under 35 U.S.C. 154(b) by 0 days.

(21) Appl. No.: 15/304,644

(22) PCT Filed: Apr. 30, 2015

(86) PCT No.: PCT/EP2015/059555
§ 371 (c)(1),
(2) Date: Oct. 17, 2016

(87) PCT Pub. No.: WO2015/166070
PCT Pub. Date: Nov. 5, 2015

(65) Prior Publication Data
US 2017/0037181 A1 Feb. 9, 2017

Related U.S. Application Data

(60) Provisional application No. 61/986,257, filed on Apr. 30, 2014.

(51) Int. Cl.
*C08G 63/672* (2006.01)
*C08G 63/66* (2006.01)
*C08G 63/80* (2006.01)
*C08G 63/78* (2006.01)
*C08G 63/88* (2006.01)

(52) U.S. Cl.
CPC .......... *C08G 63/66* (2013.01); *C08G 63/672* (2013.01); *C08G 63/78* (2013.01); *C08G 63/80* (2013.01); *C08G 63/88* (2013.01)

(58) Field of Classification Search
CPC .................................... C08G 63/66
USPC ....................................... 528/300
See application file for complete search history.

(56) References Cited

U.S. PATENT DOCUMENTS

| | | | |
|---|---|---|---|
| 2015/0111450 A1* | 4/2015 | Nederberg | C08G 63/181 442/181 |
| 2017/0145153 A1* | 5/2017 | Jacquel | C08G 63/42 |

FOREIGN PATENT DOCUMENTS

| | | | | |
|---|---|---|---|---|
| EP | 1639034 A1 * | 3/2006 | | C08G 63/183 |
| WO | WO-2013103574 A1 * | 7/2013 | | C08G 63/183 |
| WO | WO-2014054940 A2 * | 4/2014 | | C08G 63/672 |

OTHER PUBLICATIONS

Storbeck R et al: "Synthesis and properties of polyesters based on 2,5-furandicarboxylic acid and 1,4:3,6-dianhydrohexitols",Polymer, Elsevier Science Publishers B.V, GB, vol. 34, No. 23, Jan. 1, 1993 pp. 5003-5006 (Year: 1993).*
WO 2013149222 Nederberg et al. Mar. 30, 2012 Polyesters and Fibers Made Therefrom. (Year: 2012).*

* cited by examiner

*Primary Examiner* — Terressa Boykin
(74) *Attorney, Agent, or Firm* — William B. Miller

(57) ABSTRACT

Semi-crystalline polyesters from isoidide and 2,5-furandicarboxylic acid are disclosed, as well as semi-crystalline copolyesters from isoidide and a minor amount of either 1,4-butanediol or 2,3-butanediol with 2,5-furandicarboxylic acid, together with processes for making high molecular weight materials by melt polymerization providing a semi-crystalline polymer then performing solid state condensation on the semi-crystalline polymer.

4 Claims, No Drawings

POLYISOIDIDE FURANOATE THERMOPLASTIC POLYESTERS AND COPOLYESTERS AND A USE THEREOF IN HOT FILL PACKAGING

TECHNICAL FIELD

The present invention relates generally to thermoplastics, and more particularly to thermoplastic polyesters and copolyesters. From another perspective, the present invention concerns polymers prepared from biobased monomers.

BACKGROUND OF THE INVENTION

A variety of high performance thermoplastic polymers are commercially produced from monomers of a non-biobased, non-renewable nature. Commercially desirable thermoplastic polymers typically have a high glass transition temperature ($T_g$) and a high molecular weight (MW), and preferably are semi-crystalline in character so that the materials will have sufficient strength when used at high temperatures. Desirable attributes further include high thermal stability and low color. Petrochemical examples of commercially valuable thermoplastics include polyethylene terephthalate (PET, with a $T_g$ of 80° C., and a $T_m$ of 260° C.), polybutylene terephthalate (PBT, having a $T_g$ of 40° C., and a $T_m$ of 220° C.) and bisphenol-A polycarbonate (PC, with a $T_g$ of 150° C.).

Functionally equivalent biobased polymeric materials have been increasingly sought in recent years as the manufacturing cost of conventional petroleum-based polymers has increased. Over the years various classes of rigid biobased, difunctional monomers have been developed from which high performance, biobased thermoplastic polyesters could be made, including 2,5-furandicarboxylic acid (FDCA), acetalized aldaric acid and alditols, and isohexides.

Of these materials, the isohexides are bicyclic, rigid diols that differ only in the orientation of the hydroxyl groups at C2 and C5. They can be obtained by cyclodehydration of the respective hexitols, i.e. isomannide (endo-endo) from mannitol, isosorbide (exo-endo) from sorbitol and isoidide (exo-exo) from iditol.

Mainly due to the limited availability of isomannide and isoidide, most of the scientific and patent literature on isohexide polymers describes the effects of incorporation of isosorbide (which is commercially produced on a small scale). This literature has established that incorporating isosorbide in polyesters in general produces a significant increase in the $T_g$ of the ensuing polymers, which could widen the scope of application of these materials.

However, thus far several drawbacks have hampered the successful commercialization of isohexide based polymers. The secondary hydroxyl groups are less reactive than primary groups, resulting in lower reactivity, and hence require harsh (though industrially common) melt polymerization conditions in order to build up molecular weight. However, such conditions also lead to increased degradation and color formation. Furthermore, the presence of two hydroxyl groups with a different spatial orientation as in isosorbide leads to the formation of random, stereo-irregular polymers, which prohibits crystallization.

Isoidide on the other hand has a symmetrical arrangement of the two hydroxyl groups, and efforts have been made previously to prepare polymers based on isoidide, though as noted previously these efforts have been limited in extent because of isoidide's limited availability.

Thiem and Lüders (Thiem et al., *Polym. Bull.*, vol. 11, pp. 365-369 (Berlin, 1984); Thiem et al., *Starch/Staerke*, vol. 36, pp. 170-176 (1984)) were the first to report on the synthesis of polyisoidide terephthalate (PIIT) by melt polymerization of the diol with terephthaloyl chloride (TDC) at 180° C. The resulting polymer had a number average molecular weight $M_n$ of 3,800 (by membrane osmometry), a $T_g$ of 153° C. and a $T_m$ of 192° C.

Later, Storbeck et al. (Storbeck et al., *Makromol. Chem.*, col. 194, pp. 53-64 (1993)) prepared a semi-crystalline PIIT by solution polymerization from the diol and TDC (toluene, pyridine, 100° C.), reporting however a polymer with a significantly higher number average molecular weight $M_n$ of 14,500 (by membrane osmometry), a $T_g$ of 209° C., and a $T_m$ of 261° C.

Of greater relevance to the materials of the present invention, Storbeck and Ballauf also reported the synthesis and characterization of a polyester of isoidide and FDCA (Storbeck et al., *Polymer*, vol. 34, pp. 5003-5006 (1993)). This furanoate polyester was obtained by solution polymerization of the diol with the acid chloride of FDCA (tetrachloroethane, pyridine, 25° C.) with a $M_n$ of 21,500 (by membrane osmometry) and a $T_g$ of 196° C. Although wide angle x-ray scattering (WAXS) analysis suggested a degree (very low) of crystallinity, no $T_m$ was reported.

More recently, moreover, Gomes et al. (Gomes et al., *J. Polym. Sci., Part A: Polym. Chem.*, vol. 49, pp. 3759-3768 (2011)) reported the preparation of the same isoidide furanoate polyester by a slightly adapted procedure, and mentions nothing of any observed crystallinity; the isoidide furanoate polyester made by Gomes et al. had a number average molecular weight $M_n$ of 5,650 and a $T_g$ of 140° C.

Consequently, while the literature to date does demonstrate that polyisoidide terephthalate polyesters have been made which demonstrate the desired semi-crystalline nature, there appears to be no precedent for a fully biobased semi-crystalline polyisoiside furanoate by melt polymerization, using FDCA in place of purified terephthalic acid (PTA).

SUMMARY OF THE INVENTION

The present invention in one aspect concerns high molecular weight, semi-crystalline polyisoidide 2,5-furanoate (PIIF) homopolymers and copolymers.

In another, related aspect, the invention concerns a method of making these materials by melt polymerisation to provide a semi-crystalline material and subsequent solid state post condensation (SSPC). SSPC is performed at temperatures above the glass transition temperature but approximately 10 to 20° C. below the crystalline melting temperature $T_m$, which allows for molecular weight build-up under relatively mild conditions and avoids the harsh melt polymerization conditions previously evaluated for building up molecular weight in isohexide polymers but which have been associated with increased degradation and color formation.

DETAILED DESCRIPTION OF EMBODIMENTS OF THE INVENTION

The high molecular weight, semi-crystalline polyisoidide 2,5-furanoate (PIIF) homopolymers and copolymers of the present invention, and the manner in which these may be made are illustrated by the following, non-limiting examples:

Examples

A) Materials Listing

Isoidide used herein was generally prepared according to WO 2013/125950 A1 to Hagberg et al. (hereby incorporated by reference herein), by subjecting an aqueous solution of isosorbide to epimerization in the presence of hydrogen under the influence of a catalyst comprising ruthenium on a support, preferably a carbon support. Three separate batches of isoidide were in fact prepared and used. These batches differed slightly in their manner of preparation and in their residual impurities, and while all three batches could be processed as described herein, testing of the materials made from the three batches did manifest some differences in the polymers made from each of the three independently-prepared batches, as detailed below.

2,5-FDCA dimethylester was prepared according to the procedure described in Knoop et al., *J. Polym. Sci. Part A: Polym. Chem*, vol. 51, pp. 4191-4199 (2013), and recrystallized five times from methanol prior to use.

A commercially available, technical grade isosorbide was recrystallized three times from ethyl acetate prior to use.

The following additional chemicals were also used as described hereafter: 1,4-butanediol (≥99%, Sigma-Aldrich), 2,3-butanediol (≥99%, Sigma-Aldrich), titanium(IV) isopropoxide (Ti(OiPr)$_4$, ≥97%, Sigma-Aldrich), o-xylene (anhydrous, 97%, Sigma-Aldrich), trifluoroacetic acid (99%, Sigma-Aldrich), 1,1,1,3,3,3-hexafluoro-2-propanol (or HFIP, Apollo Scientific Ltd, 99%), chloroform (Merck, p.a.), methanol (Merck, p.a.) and chloroform-d (99.8 atom % D, Sigma-Aldrich). All chemicals were used as received, unless denoted otherwise.

B) Description of Sample Testing Apparatus and Methods

DSC: Differential Scanning calorimetry measurements were conducted on a PerkinElmer Diamond® series calorimeter (PerkinElmer, Inc., Waltham, Mass.). The temperature range used was 0° C. up to 300° C. at a heating rate and cooling rate of 10° C./minute.

TGA: The thermal stability of the polyesters and copolyesters was determined by thermogravimetric analysis with an STA 6000 (Simultaneous Thermal Analyser) from PerkinElmer. The samples were heated from 30 to 600° C. at a heating rate of 10° C./minute under a nitrogen flow of 40 mL/minute.

GPC: Molecular weights of the polyesters and copolyesters were determined by gel permeation chromatography on a Viscotek HP-SEC system (Malvern Instruments, Malvern, United Kingdom), including a VE-2001 GPCmax pump and auto sampler equipped with a TDA305 Triple Detector Array (Right Angle Light Scattering (RALS)+Low Angle Light Scattering (LALS), Refractive Index (RI) Detector and Viscometer), and a 2×GPC column PSS PFG analytical linear M and guard column, molecular range ~250–2.5*10$^6$ D (PMMA in HFIP). Data were calculated with OmniSEC™, Version 4.6 software. Hexafluoroisopropanol (HFIP) containing 0.02 M potassium trifluoroacetate was used as the eluent with a flow rate of 0.7 ml/minute. Calibration of the measurements was done with PMMA standards (Easy vial PMMA standards from Agilent Technologies, Inc., Santa Clara, Calif.).

WAXS: Wide angle X-ray scattering (WAXS) powder diffractograms were recorded on a Philips PC-APD diffractometer in the reflection geometry in the angular range 4-40° (2θ), with a step size of 0.02° (2θ) and an acquisition time of 1.0 s per step. The Cu Kα1 radiation from the anode, generated at 40 kV and 30 mA, was monochromatized using a 15 μm Ni foil (λ=0.1542 nm). The diffractometer was equipped with a 1° divergence slit, a 0.2 mm receiving slit, and a 1° scatter slit.

NMR: Nuclear magnetic resonance spectra were recorded on a Bruker Avance III spectrometer operating at 400.17 MHz (1H) and 100.62 MHz (13C). CDCl$_3$ (99.8 atom % D, Aldrich) was stored on dried molecular sieves 4 Å.

U/vis: Samples (ranging from 2.5 mg/ml to 10 mg/ml) were measured on a Shimadzu UV-1650PC spectrophotometer, in the same manner as described in WO 2010077133 A1. The cell temperature was set at 20° C. using a Shimadzu CPS-controller. The absorbance at 5 mg/ml was calculated from the corresponding calibration curve.

C) Synthesis of Polyisoidide Furanoate Homopolymer and Copolymer Samples

1) Melt Polymerization Procedure

Some of the melt polymerizations were conducted in 100 mL three-neck round-bottomed flasks that were equipped with a mechanical overhead stirrer and magnetic drive, nitrogen inlet and Liebig-condenser, while others were conducted in a 250 ml glass flat flange reactor. In each melt polymerization, after charging the isoidide (or isosorbide for a comparative example), dimethyl-2,5-FDCA and optional additional minor amounts of another diol where copolyesters were prepared, the set-up was placed under vacuum and purged with nitrogen, and this cycle was repeated as needed to generate at least 15 grams of material The melt polymerization step involved two stages. During the first stage, the reaction was carried out under nitrogen to form oligomers. The reaction mixture was heated to 120° C. for 15 minutes with constant stirring. After observing the complete melting of the mixture, the catalyst (Ti(OiPr)$_4$, 0.02 mol %, in 2 mL of o-xylene) was added into the flask under a continuous flow of nitrogen. The temperature was subsequently increased to 165° C. and stirring continued for 16 hours. Finally the temperature was increased to from 220 to 240° C., and maintained there under stirring for 4 hours to complete the first stage of the pre-polymerization reaction. The distillate was collected in a cooling flask.

During the second stage of the melt polymerization to obtain higher molecular weight materials, high vacuum of 0.1 mbar was applied gradually at 240° C. for 3 hours. After completion of the reaction, the reaction mixture was allowed to cool down to room temperature under a nitrogen atmosphere, and the crude polymer was removed from the reactor using liquid nitrogen. The polymer was subsequently purified by dissolution in 100 mL of a chloroform/TFA mixture (6:1) and precipitation in 1000 mL of methanol, followed by filtration and vacuum drying at 40° C. for 12 hours.

The crude and precipitated polymers from the melt polymerization step were analyzed by nuclear magnetic resonance (NMR), gel permeation chromatography (GPC), differential scanning calorimetry (DSC), thermogravimetric analysis (TGA) and UV/vis spectroscopy, with the results shown in Table 1 and described below in the Results and Discussion section.

TABLE 1

Characterization of Isoidide Polyesters Prepared by Melt Polymerization at 220° C.

| Polymer | Yield[a] (%) | GPC crude/precipitated $M_n$ (*1000) | GPC crude/precipitated $M_w$ (*1000) | PDI | DSC crude 1st run/2nd run $T_g$ (° C.) | DSC crude 1st run/2nd run $T_m$ (° C.) | DSC crude 1st run/2nd run $\Delta H_m$ (J/g) | DSC precipitated 1st run/2nd run $T_g$ (° C.) | DSC precipitated 1st run/2nd run $T_m$ (° C.) | DSC precipitated 1st run/2nd run $\Delta H_m$ (J/g) | Abs[e] (400 nm) |
|---|---|---|---|---|---|---|---|---|---|---|---|
| PIIF* | 84 | 1.5/2.9 | 4.0/5.0 | 2.8/1.7 | 111 | 240/— | 23/— | nd | nd | nd | 0.1520 |
| PIIF[b]* | 82 | 2.0/3.3 | 4.6/5.2 | 2.2/1.6 | 113 | —/— | — | nd | nd | nd | nd |
| PIIF** | 78 | 2.1/2.6 | 3.6/4.0 | 1.8/1.6 | 100/113 | 235/— | 16/— | nd | nd | nd | 0.0480 |
| PIIF*** | | | | | | | | | | | 0.0343 |
| PISF | 81 | 2.0/3.3 | 4.6/5.2 | 2.2/1.6 | 101 | —/— | — | nd | nd | nd | 0.2520 |
| PB[1,4](5)II(95)F[c]* | 84 | 1.5/2.2 | 4.7/5.2 | 3.1/2.4 | 119 | 244/— | 19/— | 116 | 241/— | 8/— | 0.1580 |
| PB[2,3](5)II(95)F[d]* | 85 | 1.5/2.3 | 4.4/4.8 | 2.9/2.1 | 125 | 235/— | 18/— | 133 | 241/— | 5/— | 0.1105 |
| PB[1,4]F | | 7.4/8.3 | 17.0/17.5 | 2.3/2.1 | 31/31 | 170/166 | 56/54 | | | | 0.0135 |
| PB[2,3]F | | 6.7/5.2 | 14.3/10.1 | 2.1/2.0 | 91/92 | —/— | —/— | | | | 0.0765 |

[a] isolated yield
[b] polymerization temperature 240° C.
[c] feed ratio; incorporation ratio ($^1$H-NMR): 7/93
[d] feed ratio; incorporation ratio (H-NMR): 6/94
[e] 5 mg/mL in dichloromethane/hexafluoroisopropanol 8:2
*Using Batch A isoidide, prepared in round-bottomed flask
**Using Batch B isoidide, prepared in flat flange reactor
***Using Batch C isoidide, prepared in flat flange reactor

2) Solid State Post Condensation (SSPC) Procedure

Certain of the precipitated polymer samples from the melt polymerization step were dissolved in HFIP to provide a 10% polymer solution, and additional catalyst (Ti(OiPr)$_4$, 7.4 mg, 0.02 mol % based on MW) was added with stirring. A respective sample and catalyst were allowed to air dry to evaporate HFIP, and then the polymer sample with added catalyst was further dried in a vacuum oven (40° C., 100 mbar) over Sicapent® phosphorus pentoxide drying agent (EMD Millipore, Billerica, Mass.).

The thus-dried melt polymerized materials were then ground to a powder with a mortar and pestle, and subjected to SSPC (50 ml round bottom flask) conditions (elevated temperature, vacuum) for specified times. The melt-polymerized samples prepared from the Batch A isoidide were done on a smaller scale, at 100 mg in a Kugelrohr oven, while materials from Batch B were done at a 15 g scale in the flat flange reactor, demonstrating the scalability of the technique.

Samples were analysed by DSC and GPC, with the results shown in Table 2 and discussed further hereafter.

TABLE 2

SSPC of precipitated polymers obtained by melt polymerisation at 220° C.; crude polyesters.

| Polymer | $T_{SSPC}$ (° C.) | t (h) | GPC (*1000) $M_n$ (*1,000) | GPC (*1000) $M_w$ (*1,000) | PDI | DSC $T_g^a$ (° C.) | DSC $T_m^b$ (° C.) | DSC $\Delta H_m$ (J/g) | Abs (400 nm) |
|---|---|---|---|---|---|---|---|---|---|
| PIIF* | 230 | 4 | 14.2 | 30.7 | 2.2 | 159 | 274 | 36 | nd |
| | 230 | 16 | 19.8 | 44.1 | 2.2 | 170 | 281 | 41 | nd |
| | 230 | 40 | 17.7 | 43.9 | 2.5 | 164 | 274 | 35 | nd |
| | 240 | 2 | 17.9 | 45.3 | 2.5 | 168 | 274 | 36 | nd |
| | 240 | 16 | 20.9 | 55.3 | 2.6 | 174 | 284 | 42 | nd |
| PIIF** | 230 | 16 | 7.0 | 15.2 | 2.2 | 164 | 287 | 47 | 0.2203 |
| PIIF[c]** | | | 7.8 | 15.8 | 2.0 | nd | nd | nd | 0.0849 |
| PB [2,3](5) II(95)F | 220 | 16 | 18.6 | 37.3 | 2.0 | 159 | 269 | 27 | nd |
| | 220 | 40 | 13.8 | 28.0 | 2.0 | 157 | 273 | 30 | nd |
| | 230 | 16 | 24.2 | 51.7 | 2.1 | 172 | 276 | 33 | nd |
| | 230 | 40 | 13.5 | 28.7 | 2.1 | 155 | 270 | 31 | nd |
| PEF | | | 14.4 | 26.2 | 1.8 | | | | 0.0210 |

[a] second heating run.
[b] first heating run, no recovery from the melt.
[c] after precipitation, from material reported in preceding row
*Batch A isoidide used, color measurements not taken due to sample scale
**Batch B isoidide used

D) Results and Discussion

Referring now back to Table 1 for the melt-polymerized material results, melt polymerization of isoidide and 2,5-FDCA dimethylester at 220° C. resulted in solidification of the reaction mixture during the high vacuum stage. Analysis of the crude PIIF homopolyester showed that only relatively low molecular weight oligomer was formed (having an $M_n$ of 1,500, corresponding to 5 repeating units). After precipitation of the crude polymer, the $M_n$ value doubled, while the polydispersity index (PDI) improved to 1.7. Despite its low molecular weight, the oligomer already displayed a $T_g$ of 111° C. Since the observed $T_m$ was 240° C., melt polymerization was also attempted at this temperature in order to prevent premature solidification. Unfortunately no significant increase in molecular weight was achieved, while also the crude polymer showed no signs of crystallinity after cooling down from the melt. A reference polyester prepared from isosorbide and 2,5-FDCA dimethylester showed a comparable molecular weight and a somewhat lower $T_g$. As expected, this isosorbide-based reference polyester was fully amorphous.

Based upon the results obtained, however, at a 220 degrees Celsius melt polymerization temperature in making a PIIF homopolymer, and keeping in mind that the subsequent SSPC of a semi-crystalline material from a melt polymerization step would involve a transesterification and subsequent expulsion of a diol, two copolyesters with a low level of incorporation of a more volatile diol than isoidide were also prepared by melt polymerization and can be compared to the PIIF homopolymers prepared at 220 degrees and 240 degrees and to the PISF reference polymer.

The copolyester from the melt polymerization procedure with 5% added 1,4-butanediol (b.p. 235° C.) was also semi-crystalline in nature, having characteristics comparable to those of PIIF. 1,4-BDO was chosen as an additional, more volatile diol component based on its boiling point and the possibility to retain crystallinity due to the same number of carbon atoms between the hydroxyl groups in the diol. A copolyester from the melt polymerization procedure with 5% added 2,3-butanediol (boiling point of 177 deg. C.) was likewise semi-crystalline and displayed a high $T_g$. These examples demonstrate that small amounts of an added, more volatile diol co-monomer can be used in the melt polymerization step for improving the efficiency of the subsequent SSPC step, while still retaining a semi-crystalline character needed for the SSPC step.

Referring now to the several materials made by SSPC after the melt polymerization step and to Table 2, it will be observed that SSPC (at 230° C.) of the PIIF homopolyester which had been prepared by melt polymerization at 220 degrees gave a five-fold increase in $M_n$, with a low PDI value of 2.2. Furthermore, as expected, both $T_g$ and $T_m$ are observed to have increased. Increasing the SSPC reaction time to 16 hours resulted in a further, yet less dramatic increase in $M_n$ for the PIIF homopolyester. Extending the reaction to 40 hours proved to be detrimental, as is clear from the drop in $M_n$ as well as the increase in the PDI. Increasing the SSPC temperature by only 10° C. accelerated the reaction, given the increase in $M_n$ to almost 17,000 in only 2 hours. This effect appears to be lost over time, however, given the almost identical values obtained after 16 hours.

Incorporation of small amounts of the more volatile diol 2,3-BDO proved beneficial. Because 2,3-BDO is more volatile than isoidide, SSPC could be carried out at a lower temperature of 220° C., with a considerable increase in $M_n$ after 16 hours. Extending the reaction time to 40 hours also proved to be detrimental with the copolyester, however, as is clear from the drop in $M_n$ even at the lower SSPC process temperature of 220° C. Comparison of the homo- and co-polyester prepared by SSPC at 230 degrees Celsius for 16 hours showed an almost 20% further increase in $M_n$ in the copolyester as compared to the homopolyester.

What is claimed is:
1. A semi-crystalline isoidide furanoate copolyester having a crystalline melting temperature $T_m$ from isoidide, one of 1,4-butanediol or 2,3-butanediol, and 2,5-furandicarboxylic acid.
2. The copolyester of claim 1, wherein the isoidide and the 1,4-butanediol or 2,3-butanediol are used in about a 95:5 ratio by weight of isoidide to butanediol.
3. A method of making a semi-crystalline isoidide furanoate homopolyester, comprising preparing a semi-crystalline polymer of isoidide and 2,5-furandicarboxylic acid having a crystalline melting temperature $T_m$ by melt polymerization, then performing solid state post condensation on the semi-crystalline polymer from melt polymerization above its glass transition temperature but below its crystalline melting temperature.
4. A method of making a copolyester according to claim 1, comprising preparing a semi-crystalline polymer of isoidide, one of 1,4-butanediol or 2,3-butanediol, and 2,5-furandicarboxylic acid having a crystalline melting temperature $T_m$ by melt polymerization, then performing solid state post condensation on the semi-crystalline polymer from melt polymerization above its glass transition temperature but below its crystalline melting temperature.

* * * * *